United States Patent
Min et al.

(10) Patent No.: US 7,674,559 B2
(45) Date of Patent: Mar. 9, 2010

(54) LITHIUM SECONDARY BATTERY INCLUDING A SEPARATOR

(75) Inventors: Jae Yun Min, Yongin-si (KR); Won Chull Han, Yongin-si (KR); Jin Hee Kim, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 280 days.

(21) Appl. No.: 11/409,030

(22) Filed: Apr. 24, 2006

(65) Prior Publication Data

US 2006/0246355 A1    Nov. 2, 2006

(30) Foreign Application Priority Data

Apr. 27, 2005    (KR) .................. 10-2005-0035290

(51) Int. Cl.
*H01M 6/18*    (2006.01)

(52) U.S. Cl. ...................................... 429/304; 429/322

(58) Field of Classification Search ................ 429/136, 429/235, 247, 304, 322
See application file for complete search history.

(56) References Cited

U.S. PATENT DOCUMENTS

| | | | | |
|---|---|---|---|---|
| 6,066,417 A * | 5/2000 | Cho et al. | ................... | 429/303 |
| 6,423,444 B1 * | 7/2002 | Ying et al. | ................... | 429/129 |
| 6,475,677 B1 * | 11/2002 | Inda et al. | ................... | 429/304 |
| 2004/0041537 A1 * | 3/2004 | Ishida et al. | ................ | 320/107 |
| 2004/0106046 A1 * | 6/2004 | Inda | ......................... | 429/322 |
| 2005/0000086 A1 * | 1/2005 | Mizutani et al. | ........... | 29/623.1 |
| 2005/0026037 A1 * | 2/2005 | Riley et al. | ................. | 429/210 |

* cited by examiner

*Primary Examiner*—Dah-Wei D. Yuan
*Assistant Examiner*—Zachary Best
(74) *Attorney, Agent, or Firm*—Stein McEwen, LLP

(57) ABSTRACT

A lithium secondary battery includes an electrode assembly having two electrodes and a separator interposed between the two electrodes, and a case for storing the electrode assembly, wherein the separator is formed by using a binder and a filler including a solid electrolyte having lithium ion conductivity. The lithium secondary battery has a separator and an electrolyte capable of increasing internal ion-conductivity. Also, a lithium secondary battery has a separator capable of safely preventing a short circuit between the electrodes in a possibly high temperature.

14 Claims, 2 Drawing Sheets

LITHIUM SECONDARY BATTERY INCLUDING A SEPARATOR

CROSS-REFERENCE TO RELATED APPLICATIONS

This application claims the priority of Korean Patent Application No. 2005-35290, filed on Apr. 27, 2005, in the Korean Intellectual Property Office, the disclosure of which is incorporated herein in its entirety by reference.

BACKGROUND OF THE INVENTION

1. Field of the Invention

Aspects of the present invention relate to a lithium secondary battery, and more particularly, to a separator of an electrode assembly of a lithium secondary battery.

2. Description of the Related Art

A secondary battery has many advantages such as rechargeability, a compact size, and a high capacity. Recently, various kinds of secondary batteries have been being widely researched and developed as power supplies for portable electronic devices such as camcorders, portable computers, and mobile phone. Representative secondary batteries that are being currently developed include nickel hydrogen batteries, nickel metal hydride (Ni-MH) batteries, lithium ion batteries, lithium ion polymer batteries, and the like.

Since lithium, which is widely used as a material of a secondary battery, has a small atomic weight, it is an advantageous material to use for obtaining a battery having a large electric capacity per unit mass. On the other hand, since lithium violently reacts with water, it is typically necessary to use a non-hydrophilic electrolyte in a lithium-based battery. Advantageously, such a lithium secondary battery is capable of generating an electromotive force of about 3 to 4V because it is not influenced by the electrolysis voltage of water.

Non-hydrophilic electrolytes used in lithium ion secondary batteries are classified into liquid electrolytes and solid electrolytes. Liquid electrolytes are formed by dissociating lithium salt into an organic solvent. The organic solvent may often include ethylene carbonate, propylene carbonate, carbonate having other alkyl group materials, or equivalent organic compounds.

Solid electrolytes are capable of carrying ions such as a lithium ion when a voltage is applied. Solid electrolytes can be classified into organic group electrolytes composed of polymers and inorganic group electrolytes composed of crystalline or amorphous inorganic materials. Solid electrolytes are considered to overcome problems of liquid electrolytes, such as freezing in a low temperature, evaporation in a high temperature, and leakage.

A non-hydrophilic electrolyte typically has low ion-conductivity, and particularly, the ion-conductivity of solid electrolyte are typically lower than that of liquid electrolytes. The lower ion-conductivity of solid electrolytes may be compensated for by increasing the area of an activation material in the electrodes and enlarging the facing areas of the electrodes.

However, the enlargement of the facing areas of the electrodes is limited by various constraints. Consequently, the low ion-conductivity of the electrolyte increases internal battery impedance, thereby resulting in a significant internal voltage drop. Particularly, when high current discharge is necessary, the low ion-conductivity of the electrolyte limits the current in the battery and the battery output. Therefore, it is desirable to continuously make efforts to improve the ion-conductivity of these types of batteries.

The separator may also serve as limitation on the mobility of lithium ions between the two electrodes. Except for the case in which a pure solid electrolyte also functions as a separator, when the separator between the two electrodes does not have sufficient permeability or wettability for the electrolyte, the limited mobility of lithium ions accordingly creates difficulty during discharge. In the solid electrolyte separator, the thickness of the separator corresponding to the ion path is an important parameter of internal resistance.

Important characteristics of a separator relating to performance of a battery are ion-conductivity (of a polymer separator), thermal resistance, resistance to thermal deformation, chemical resistance, mechanical strength, cross-sectional porosity (representing a percentage of the area of pores in a particular cross-section of the separator), wettability for an electrolyte, and the like.

On the other hand, a separator of a lithium secondary battery using a liquid electrolyte also naturally functions as a safety device for preventing overheating in the battery. It is known that a microporous film made of a polyolefin or its equivalent as a typical material of a separator may be softened and partially melted when its temperature increases over a predetermined level in an abnormal condition. Accordingly, pores of the microporous film, functioning as a path for the electrolyte and lithium ions, are shut down in an abnormal condition so that transportation of lithium ions is blocked and the internal and external current flow in the battery stops. Therefore, it is possible to stop the temperature increase of a battery.

However, when the temperature of a battery abruptly increases for reasons such as external heat transfer, the temperature of the battery may remain high for an extended time period in spite of the shutting down of the pores of the separator, and the separator may be damaged. Specifically, an internal short circuit may be generated when the separator shrinks or is partially melted, and facing portions of the electrodes may make contact with each other in the shrunken or melted area. This type of short circuit is considered to be very dangerous.

Recently a high capacity secondary battery has been manufactured to provide a large current flow over a short time period. In this type of battery, once an abnormal overcurrent condition occurs, the temperature of the battery is not immediately reduced, but the separator is continuously melted by the existing heat, even when the pores of the separator are blocked. Accordingly, the possibility of generating an internal short circuit caused by damage in the separator increases even higher.

Considering the aforementioned scenarios, the shrinkage or melting of the separator in an abnormal overheating condition is a more critical issue than the cutoff of the current by blocking of the pores of the separator. Consequently, it is desirable to provide a secondary battery that can safely prevent a short circuit between the electrodes at a relatively high temperature, such as, for example, 200° C. or more.

SUMMARY OF THE INVENTION

Accordingly, aspects of the present invention provide a lithium secondary battery having a separator and an electrolyte capable of increasing internal ion-conductivity.

Also, the aspects of the present invention provide a lithium secondary battery having a separator capable of safely preventing a short circuit between the electrodes in high temperature conditions.

According to an aspect of the present invention, there is provided a lithium secondary battery including an electrode assembly having two electrodes and a separator interposed between the two electrodes, and a case for storing the electrode assembly, wherein the separator comprises a binder and a filler including a solid electrolyte having lithium ion conductivity.

According to an aspect of the present invention, the filler may consist of only a solid electrolyte, or may be made of a mixture of a solid electrolyte and a non-ion-conductive ceramic material. The non-ion-conductive ceramic material may include at least one material selected from the group consisting of alumina, silica, zirconia, titania, and ion-conductive glass.

According to an aspect of the present invention, the solid electrolyte may include at least one composition selected from the group consisting of $LiCl—Li_2O—P_2O_5$, $LiTi_2(PO_4)_3—AlPO_4$, a single crystal of $Li_3N$, $LiI—Li_2S—P_2S_5$, $LiI—Li_2S—B_2S_3$, $LiI—Li_2S—SiS_4$, $P_2O_5—SiO_2—Li_2O$, $P_2O_5—TiO_2—Li_2O$, $P_2O_5—Al_2O_3—Li2O$, $Li_2S—GeS_2—P_2S_5$, and $La(0.55)-Li(0.35)-TiO_3$, or a combination thereof.

According to an aspect of the present invention, in addition to the solid electrolyte, a liquid electrolyte may be also be used. In this case, the separator may constitute a porous film. Also, the filler itself may have a porosity to provide the porous separator film. A mass ratio of the filler and the binder may be 80:20, or, for example, may be 95:5 or more, so that the amount of filler is much greater than the amount of binder. Particularly, in order to improve the porosity of the separator film according to an aspect of the present invention, at least one of the filler materials may be formed by partially sintering primary particles to form secondary particles, and locally combining the secondary particles with the binder. According to an aspect of the present invention, the separator is not required to be separately formed from the two electrodes of a lithium secondary battery and is not required to be interposed between the electrodes as a separate component. Instead, the separator may be integrated with the surface of one the electrodes. For example, the separator may be formed on the surface on an electrode by dipping, laminating, or the like. The electrode having a separator formed thereon may then be stacked and wound with the other electrode.

According to another aspect of the present invention, an electrode for a lithium secondary battery has a separator film formed on a surface thereof, wherein the separator comprises a binder and a filler and wherein the filler comprises a solid electrolyte having lithium ion conductivity.

According to another aspect of the present invention, a method of forming a porous separator film on a surface of an electrode of a lithium secondary battery comprises partially sintering primary filler particles to form secondary filler particles; combining the secondary filler particles with a binder and a solvent to form a separator film solution, wherein a mass ratio of the secondary filler particles to binder in the separator film solution is 80:20 or greater; applying the separator film solution to the surface of the electrode; and removing the solvent.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
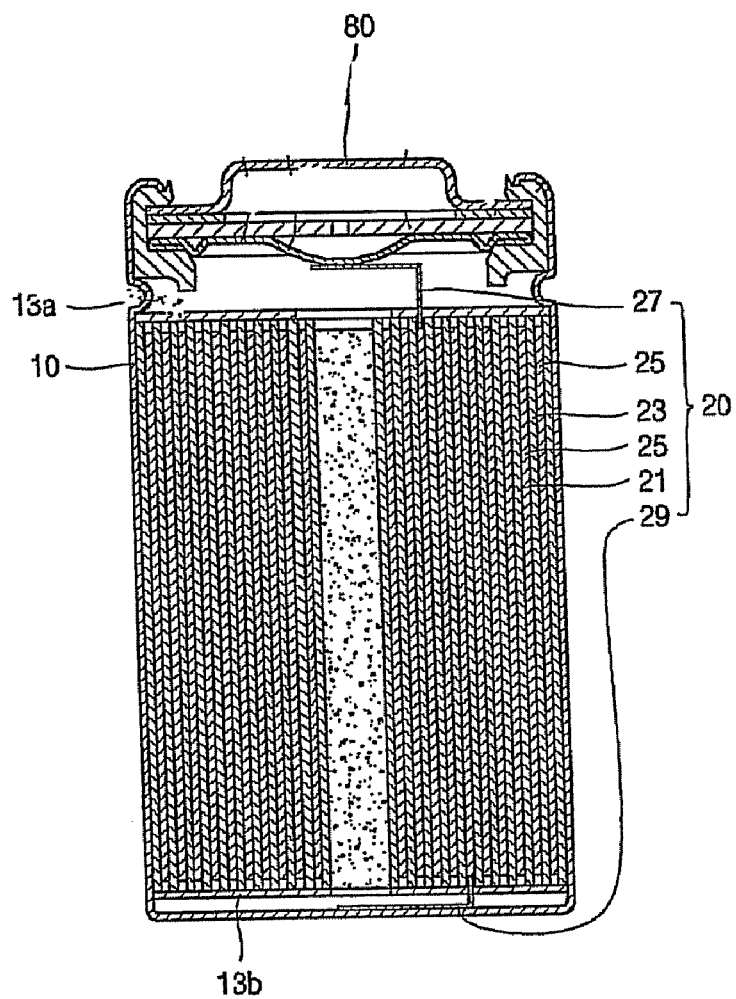
FIG. 1 is a front cross-sectional view illustrating a cylindrical lithium secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Typically, in order to manufacture a secondary battery as shown in FIG. 1, two electrodes 21 and 23 having activation materials on their charge collectors are first provided. Then, electrode taps 27 and 29 are connected to uncovered portions where the activation material does not cover the charge collector. A separator 25 is interposed between the two electrodes 21 and 23 to prevent a short circuit. A resulting layered structure of the electrodes and the separator is wound to provide a jelly roll type electrode assembly 20. The electrode assembly 20 is inserted into a can 10 having an opening, and the opening is covered with a cap assembly 80, with a gasket 30 being interposed between the can 10 and the cap assembly 80 for sealing. Before the electrode assembly is inserted into the can, it is combined with a lower insulation plate 13b, so that the lower insulation plate 13b is installed on a bottom surface of the can. After the electrode assembly 20 is inserted, the electrode tap 29 is connected to the can 10, and the electrolyte is inserted. An upper insulation plate 13a is installed on the electrode assembly 20, and the other electrode tap 27 is welded to the cap assembly before the opening is sealed.

A method of forming an electrode assembly 20 in a lithium secondary battery according to an embodiment of the present invention includes: forming electrodes 21 and 23 by covering a charge collector with a slurry composed of a binder resin and an electrode activation material; forming a separator film on at least one of facing surfaces of the electrodes in the battery; and forming an electrode assembly 20 having the electrodes 21 and 23 with the separator film formed thereon.

In this case, in order to provide the separator film on at least one of the facing surfaces of the electrodes in a jelly roll type electrode assembly formed by stacking and winding the two electrodes, the separator film may be formed on respective outer surfaces or respective inner surfaces of the electrodes. Alternatively, the separator film may be formed on both the inner and outer surface of one of the electrodes. For example, as shown conceptually in FIG. 2, the separator film 130 may be formed on both surfaces of the inner and outer activation layers 113 that are formed on both surfaces of the charge collector 111 of one of the electrode. (In FIG. 2, the reference numeral 115 designates an electrode tap.) In this case, adequate separation of the electrodes may be achieved without forming a separator film on the other electrode. In order to integrate the separator film 130 onto both surfaces of the electrode as a single body, the electrode may be dipped into a separator film solution that includes solid electrolyte particles 131 having ion-conductivity, and then dried.

Alternatively, an individual separator film may be interposed between the two electrodes. In order to prevent a short circuit between the two electrodes when a jelly roll is formed by stacking and winding the electrodes, two separator films may be interposed between the two electrodes, and then wound with the electrodes.

A conventional method of forming the electrodes may be adopted to provide the electrodes of a secondary battery according to an aspect of the present invention. In other words, at least one surface of a metal foil or mesh including copper or aluminum as a charge collector may be covered with an activation material slurry including a binder and an activation material powder.

Typically, a copper charge collector is made of a foil having a thickness of 10 to 15 μm. The activation material slurry is coated onto both surfaces of the charge collector. The activation material slurry may be made by mixing an activation material such as graphite or activated carbon with a binder such as polyvinylidene fluoride (PVdF). Since graphite or activated carbon naturally has good conductivity, it may not be necessary to use a conductor.

Typically, an aluminum charge collector is made of a mesh having a thickness of about 20 μm. An activation material slurry coating including a lithium-containing activation material powder such as lithium cobaltate, lithium permanganate, or lithium nickelate, a conductive crude material, and a binder is coated on the surface of the mesh.

An appropriate amount of a solvent such as acetone is used to solvate the binder used in the activation material slurry. After the activation material slurry is coated onto the surface of the mesh, the solvent is removed through a baking process.

After the activation material slurry is uniformly coated onto the mesh, the electrode plate is pressed by using a roller, so that the thickness of the activation material coating is reduced to about 100 μm. The roller process may be performed after a separator film according to an aspect of the present invention has been integrated with the surface of the slurry of the electrode.

Figure 2:
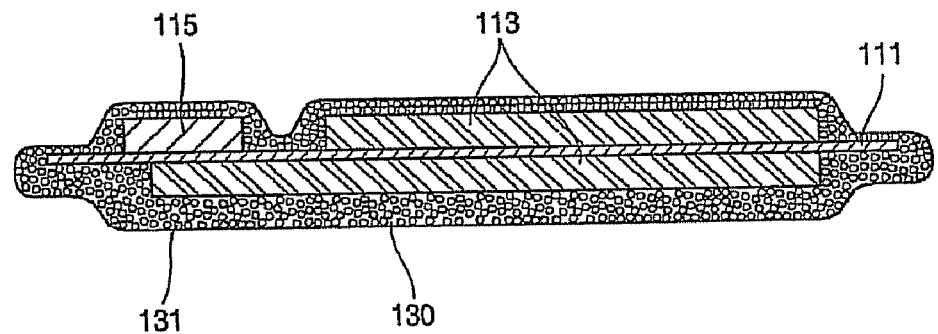
FIG. 2 is a transverse cross-sectional view conceptually illustrating a separator film having a solid electrolyte on both surfaces of an electrode in an electrode assembly according to an embodiment of the present invention.

According to an aspect of the present invention as shown in FIG. 2, the separator film is not provided separately from the electrode, but rather, the separator film is formed onto the electrode by coating a precursor solution of the separator film or a separator film solution onto a surface of the activation material slurry layer of at least one electrode and then removing solvent components from the separator film solution or curing the precursors.

In order to form the separator film 130, a binder material, a solvent, and a filler powder are agitated to provide a slurry or liquid compound. The filler is formed by mixing solid electrolyte particles 131 and a powder made of a non-electrolyte ceramic material 133. The solid electrolyte may include a compound selected from a group consisting of $LiCl$—$Li_2O$—$P_2O_5$, $LiTi_2(PO_4)_3$—$AlPO_4$, a single crystal of $Li_3N$, $LiI$—$Li_2S$—$P_2S_5$, $LiI$—$Li_2S$—$B_2S_3$, $LiI$—$Li_2S$—$SiS_4$, $P_2O_5$—$SiO_2$—$Li_2O$, $P_2O_5$—$TiO_2$—$Li_2O$, $P_2O_5$—$Al_2O_3$—$Li_2O$, $Li_2S$—$GeS_2$—$P_2S_5$, and $La(0.55)$-$Li(0.35)$-$TiO_3$. The non-electrolyte material (i.e., non-ion-conductive material) may include a ceramic material such as alumina (aluminum oxide), silica (silicon oxide), zirconia (zirconium oxide), and titania (titanium oxide). As used herein, the term "non-ion-conductive material" is a relative concept, and a material having a level of ion-conductivity that is lower than that of the solid electrolyte may be used.

A filler that is formed by sintering a powder having a small particle size may be broken when an electrode assembly is formed by winding the electrodes and the separator. To keep this from happening, a separator film having a much lesser tendency to become broken may be formed as described herein. In particular, a separator film solution may be formed by providing a mixed powder of solid electrolyte particles 131 and the non-electrolyte ceramic material 133, which are mixed with the binder 135 at a mass ratio of about 95:5 of filler to binder, and a solvent.

The mixed powder may be formed by providing primary particles such as the solid electrolyte particles 131 or the non-electrolyte ceramic material 133, sintering the primary particles to partially melt the surface of the particles, coarsely breaking out the sintered particles, and then forming secondary particles by lumping at least three primary particles together to form clumps, which may resemble a bunch of grapes. The primary particle may have a scale shape, and the secondary particle may have a layered structure. The primary particle or individual particle may have a width of 0.01 to 0.3 μm, and an individual layer having the shape of the scale in the layered particle group may have a width of 100 nm to 1 μm.

Figure 3:
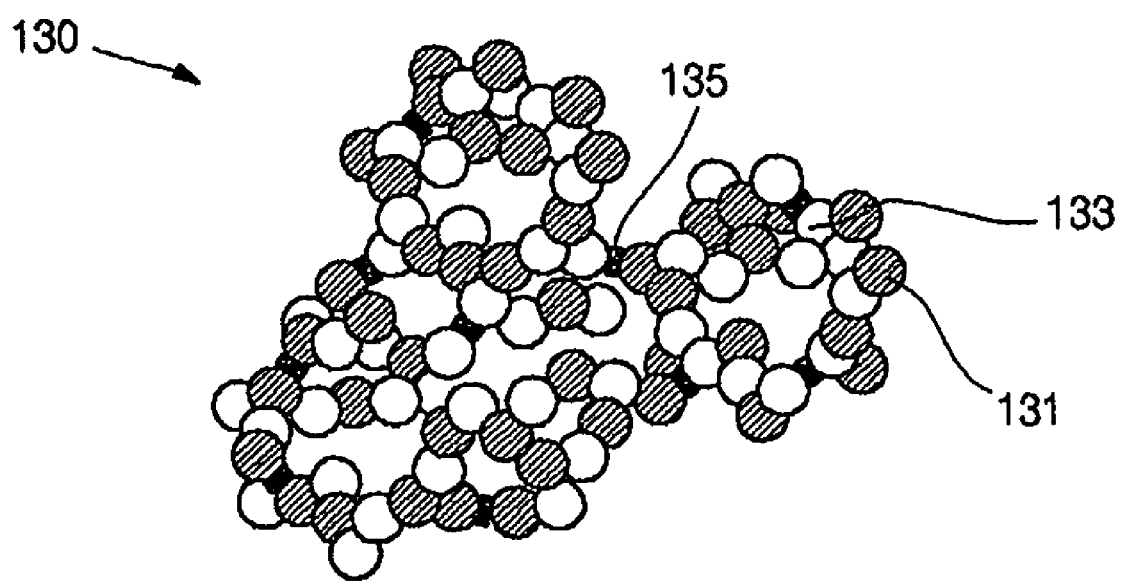
FIG. 3 is a conceptual diagram illustrating that solid electrolyte particles form secondary particles with other ceramic fillers, and the secondary particles are connected with one another by a binder functioning as a bridge in a separator film.

After the separator film 130 is formed by removing the solvent, the amount of the binder remains small in comparison with the amount of filler. Therefore, all of the particles are not coated by the binder, but, as shown in FIG. 3, the binder 135 is present in the form of bridges between the secondary particles or bridges between the primary and secondary particles. Such a construction provides higher ion-conductivity in comparison with a construction having filler particles entirely covered by binders.

In other words, when the binder wraps around the entire surface of individual secondary particles to combine them, then ion-conduction through an internal portion of the secondary particle can not be sufficiently achieved if the ion-conductivity of the binder is small. Therefore, in order to increase the ion-conductivity of the separator film regardless of the ion-conductivity of the binder, the binder should not wrap around the entire surface of the secondary particles, but rather should be present on only a portion of the surface of the secondary particles so that the binder acts as a bridge connecting the secondary particles. For this purpose, the binder is preferably used in a small amount in the slurry for forming the separator film. For example, if the mass ratio of the filler and the binder in the separator film is from about 98:2 to about 85:15, a separator film may be obtained in which the filler is not completely covered with the binder. In other words, it is possible to avoid the problems of insufficient ion-conduction through the filler material, particularly through the solid electrolyte, that may arise when a binder having low ion-conductivity covers the filler material. At the same time, sufficient binder is present to avoid problems of breaking of the separator film during winding of an electrode assembly.

A method of forming the separator film on the surface of the electrode may include a whole surface printing method such as a gravure printing, a spray method, a dipping method, lamination or the like.

For example, according to an aspect of the present invention, zirconia powder and an amorphous sulfide group-containing material such as, for example, $LiI$—$Li_2S$—$B_2S_3$ are mixed in equal amounts (96 wt % total). Then, acrylic rubber (4 wt %) formed of methacrylate is mixed in. The mixture is diluted by a solvent to have a viscosity of 3,000 cp to provide a slurry. The slurry is coated on the surface of the electrode by printing. The electrode is then passed through a dryer at a temperature of 120° C. to remove the solvent, and the separator film is thereby formed on the surface of the electrode.

When two or more kinds of filler particles are present, if the sintering temperature of one particle is lower than the sintering temperature of the other, the particle having a lower sintering temperature may function as a binder in the secondary particle. Therefore, the entire sintering temperature can be reduced.

In the separator film formed through the aforementioned processes, the pores between the secondary particles and the pores between primary particles that make up the secondary particles may be filled with a liquid or gel electrolyte to allow lithium ions to move between the two electrodes through the electrolyte. In addition, the lithium ions can move between the two electrodes through the solid electrolyte itself. The ion-conductivity of the entire battery can be considerably increased by providing an electrolyte filling the pores and by providing a solid electrolyte in the filler.

Alternatively, it is possible to not use a liquid electrolyte at all. The lithium ions can be conducted to the region where the solid electrolyte particles in the separator film come in contact with each other. Such an ion-conduction path may be formed in a multiple manner, that is, in the form of multiple paths and thus, the ions can be transported via other paths even when the binder or a non-ion-conductive particle intercepts the middle of a particular ion path. However, when even a small amount of electrolyte solution, such as a gel type electrolyte solution, is soaked into the separator film, the ion-conduction path can be diversified. Since the ion-conductivity in an electrolyte solution is higher than that in a solid electrolyte, the entire ion-conductivity can be improved.

When a liquid electrolyte is used, the separator film may have a high porosity. In order to obtain a porosity of 50% or more, the percentage of the binder should be lower than 20%, and the binder should not be swelled. Particularly, the swelling property of the electrolyte should be low. An acrylic rubber binder is an example of a binder that satisfies these conditions, because it has a strong binding force for other materials and a low swelling property.

When the amount of binder is kept low, it becomes more important to disperse the binder uniformly. This task is very difficult, so that it has been hard to obtain a film having a high porosity according to a conventional art. However, when a ceramic material including a partially sintered solid electrolyte according to an aspect of the present invention is used as a filler, and an acrylic rubber binder is also used, the binder may be easily dispersed, so that the film having a high porosity can be obtained while using a small amount of binders.

In the formation of an electrode assembly, two electrodes are stacked and wound with the separator film being formed on at least one surface of the electrodes. Since the separator film is integrated with the surface of the electrode and functions as a separator by itself, it is not necessary to interpose an additional, separate separator film between the electrodes. But, in order to provide a shutdown function of a conventional separator, a separate insulation film formed of a polyolefin-based resin may be provided in addition to the separator film according to an aspect of the present invention. In this case, the separator film according to an aspect of the present invention and the polyolefin-based resin insulation film function together as a separator in a secondary battery. In this case, in order to prevent the polyolefin-based resin insulation film from reducing the ion-conductivity to be as low as the ion-conductivity of a conventional separator, the thickness of the polyolefin-based resin insulation film may be reduced to about one-half of the thickness of a conventional separator film.

A method of forming a separator film on the surface of the electrode in a single body (i.e., integrating the separator film onto the surface of the electrode) according to an aspect of the present invention has some advantages over a conventional method of separately forming the separator and the electrode.

Specifically, in a conventional method, when the electrode assembly is formed by stacking the two electrodes and the separator and winding them after the stacking, the alignment of the separators may become deviated, and thereby, a short circuit may be generated between the two electrodes. However, if the separator is integrated with an electrode so as to cover the surface of the electrode, it not necessary to adjust the alignment of the separator and the electrodes, since alignment deviation does not occur.

In addition, when the separator and the electrode are separately formed, the separator may become shrunken in an abnormal overheating condition of the battery, and thereby, a short circuit between the electrodes may be generated. However, even in an abnormal overheating condition, if the separator is integrated with the electrode according to an aspect of the present invention, the possibility of shrinkage of the separator or a short circuit is significantly reduced due to the strong binding force of the separator to the electrode. Also, it is possible to reduce possibility of damage such as a tear of the separator during a manufacturing process when the separator is integrated with the electrode in a single body.

According to an aspect of the present invention, since the solid electrolyte is made of a kind of ceramic material having a high thermal resistance, the filler of the separator film functions to prevent deformation such as shrinkage or melting that can generate a short circuit between the electrodes at a locally high temperature of, for example, 300° C. The solid electrolyte may be amorphous or crystalline, and may be independently used or combined with alumina, zirconia, silica, and the like. In addition, it is advantageous that these materials provide an improved persistency of the separator film, and that the partially sintered particles having a clustered shape provide an increased porosity.

After an electrode assembly has been formed by winding as described herein, the electrode assembly is inserted into a can and sealed with a cap assembly. Typically, a liquid electrolyte is injected through an injection hole in the cap assembly, and then, the injection hole is sealed. The separator film of the electrode assembly according to aspects of the present invention has a high porosity, so that the electrolyte injection speed can be increased to twice or more of the electrolyte injection speed that is obtained when conventional separator made of a polyolefin-based material is used in the electrode assembly.

Now, regarding a method of forming secondary sintered particles having a clustered shape (for example, in a shape resembling a bunch of grapes) according to an aspect of the present invention, the secondary sintered particles may be formed by using various kinds of methods such as a chemical method, in which the primary particles are melted by using a chemical material and re-crystallized, or a physical method, in which an external pressure is applied. As an easy method, the material may be heated to the melting point of the particles, and then, necking may be applied to the material. A melting ratio in a partially melted state may be determined to allow the particle shape corresponding to a characteristic of the present invention not to be broken when the sintered particles are mixed with the binder, the solvent, etc., in a subsequent agitation process, and to have a small density.

Preferably, but not necessarily, when a ceramic material is used to form the filler with the solid electrolyte, an individual particle of the particle group having a clustered shape or a secondary particle has a diameter of 0.01 to 0.3 μm, and an individual thin layer having a scale shape preferably, but not necessarily, has a width of 100 nm to 1 μm. The size of the particle can be identified by viewing an SEM (scanning electron microscope) photograph after a material having a superior property is formed.

The ceramic material or filler constituting the separator film according to an aspect of the present invention has a thermal expansion of 0.2% or less at a temperature of 200° C., or 0.1 to 0.4% at a temperature of 400° C. If the ceramic material has a thermal expansion higher than the above values, the ceramic material may cause deformation of a battery at elevated temperatures due to an increasing inner pressure.

If the particles are partially sintered, they are not regularly spaced as in a crystal structure because lumped particles are irregularly arranged with one another. It is difficult to fill the vacant space of the separator with fillers composed of the ceramic material at a high density. Furthermore, it is possible to prevent resin from filling the space between the particles by reducing the amount or proportion of resin. These methods will be helpful for increasing the cross-sectional porosity of the separator. The thermal conductivity of the ceramic material according to the present invention is preferably 10 W/(m× K) within a relatively wide temperature range from 500 to 1000° C.

Preferably, the binder according to an aspect of the present invention is mainly formed of polymer resin, and the polymer resin may include a polymer or copolymer having a high thermal resistance, such as acrylate or methacrylate.

According to as aspect of the present invention, the solid and liquid electrolytes are mixed to form various ion paths in the separator film. Therefore, the ion-conductivity can be improved. Since the separator film is formed of a ceramic material functioning as a solid electrolyte, the shrinkage or melting problems can be solved in comparison with the conventional polyolefin separator, so that a short circuit of the electrodes can be safely prevented.

Particularly, when the solid electrolyte is formed of a ceramic material that can be partially sintered, a separator film having a high porosity can be formed by including a primary or secondary particle together with a small amount of binders, and thus, a sufficient amount of electrolytes can be included. Therefore, it is possible to increase the ion-conductivity.

Furthermore, according to an aspect of the present invention, it is possible to form the separator film using a small amount of binders in addition to the solid electrolyte to provide various ion-conduction paths. Therefore, it is possible to avoid damage or deformation at a high temperature. Also, it is possible to obtain sufficient ion-conductivity and prevent a short circuit.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium secondary battery comprising
an electrode assembly having two electrodes and a separator interposed between the two electrodes and
a case that contains the electrode assembly,
wherein the separator comprises a binder and a filler including solid electrolyte particles having lithium ion conductivity and a non-ion-conductive ceramic powder,
wherein the solid electrolyte particles and the non-ion-conductive ceramic powder are connected to each other,
wherein a mass ratio of filler to binder in the separator is about 95:5 or greater, and
wherein the binder does not cover entire surfaces of the solid electrolyte particles and the non-ion-conductive ceramic powder, wherein the solid electrolyte particles include at least one composition selected from the group consisting of $LiCl-Li_2O-P_2O_5$, $LiTi_2(PO_4)_3-AlPO_4$, single-crystal $Li_3N$, $LiI-Li_2S-P_2S_5$, $LiI-Li_2S-B_2S_3$, $LiI-Li_2S-SiS_4$, $Li_2S-GeS_2-P_2S_5$, and $La(0.55)-Li(0.35)-TiO_3$, or a combination thereof.

2. The lithium secondary battery according to claim 1, wherein the solid electrolyte particles are inorganic.

3. The lithium secondary battery according to claim 2, wherein the inorganic solid electrolyte particles are made of a ceramic material.

4. The lithium secondary battery according to claim 1, wherein the non-ion-conductive ceramic powder includes at least one material selected from the group consisting of alumina, silica, zirconia, and titania.

5. The lithium secondary battery according to claim 1, wherein the filler comprises secondary particles formed of partially sintered primary particles of the solid electrolyte particles or formed of a partially sintered mixture of primary particles of the solid electrolyte particles and primary particles of the non-ion-conductive ceramic powder.

6. The lithium secondary battery according to claim 5, wherein the secondary particles are formed by heating the filler to a temperature near the lowest of the melting point of the solid electrolyte particles and the melting point of the non-ion-conductive ceramic powder and applying a necking process.

7. The lithium secondary battery according to claim 1, wherein the binder of the separator includes an acrylic rubber.

8. The lithium secondary battery according to claim 1, wherein the binder includes methacrylate.

9. The lithium secondary battery according to claim 1, wherein the separator is in the form of a separator film integrated with at least one surface of at least one of the electrodes.

10. The lithium secondary battery according to claim 9, wherein the separator film is porous and wherein pores of the separator film are filled with a liquid or gel electrolyte.

11. The lithium secondary battery according to claim 9, wherein the separator film is formed by dipping at least one of the electrodes into a separator film solution.

12. The lithium secondary battery according to claim 9, wherein the separator film is formed on at least one of the electrodes by printing.

13. The lithium secondary battery according to claim 9, wherein the separator film is formed on one or both of the electrodes by spraying.

14. The lithium secondary battery according to claim 1, wherein the separator comprises
a first separator film comprising the binder and the filler including the solid electrolyte particles having lithium ion conductivity and the non-ion-conductive ceramic powder, wherein the first separator film is porous and is integrated with at least one surface of at least one of the electrodes, and
a second separator film that comprises a polyolefin-based resin.

* * * * *

UNITED STATES PATENT AND TRADEMARK OFFICE
CERTIFICATE OF CORRECTION

PATENT NO. : 7,674,559 B2　　　　　　　　　　　　　　　　　　　　　　　　　　Page 1 of 1
APPLICATION NO. : 11/409030
DATED : March 9, 2010
INVENTOR(S) : Jae Yun Min et al.

It is certified that error appears in the above-identified patent and that said Letters Patent is hereby corrected as shown below:

Column 10, line 23, "partially sintered primary particles of the solid electrolyte particles or formed of" should be deleted.

Signed and Sealed this

Eighth Day of June, 2010

David J. Kappos
*Director of the United States Patent and Trademark Office*